United States Patent [19]
Stewart

[11] Patent Number: 4,745,593
[45] Date of Patent: May 17, 1988

[54] ARRANGEMENT FOR TESTING PACKET SWITCHING NETWORKS

[75] Inventor: Gilbert M. Stewart, Bolingbrook, Ill.

[73] Assignee: American Telephone and Telegraph Company, AT&T Bell Laboratories, Murray Hill, N.J.

[21] Appl. No.: 931,685

[22] Filed: Nov. 17, 1986

[51] Int. Cl.$^4$ .......................................... H04L 11/12
[52] U.S. Cl. ...................................... 370/15; 370/60; 371/33
[58] Field of Search ...................... 370/13, 14, 15, 16, 370/60, 94, 13.1; 371/33, 62

[56] References Cited

U.S. PATENT DOCUMENTS

| | | | |
|---|---|---|---|
| 2,986,610 | 5/1961 | Maurushat, Jr. | 179/175.3 |
| 3,814,859 | 6/1974 | Vrba et al. | 179/15 |
| 3,823,269 | 7/1974 | Saito | 179/15 |
| 4,022,979 | 5/1977 | Smith | 179/15 |
| 4,059,729 | 11/1977 | Eddy et al. | 179/15 |
| 4,271,506 | 6/1981 | Broc et al. | 370/89 |
| 4,279,032 | 7/1981 | Smith | 370/15 |
| 4,314,367 | 2/1982 | Bakka et al. | 370/60 |
| 4,380,810 | 4/1983 | Canniff | 370/15 |
| 4,399,531 | 8/1983 | Grande et al. | 370/94 |
| 4,486,877 | 12/1984 | Turner | 370/15 |
| 4,550,397 | 10/1985 | Turner et al. | 370/60 |
| 4,577,311 | 3/1986 | Duquesne et al. | 370/94 |
| 4,584,679 | 4/1986 | Livingston et al. | 370/94 |
| 4,616,359 | 10/1986 | Fontenot | 370/60 |
| 4,656,622 | 4/1987 | Lea | 370/16 |
| 4,685,102 | 8/1987 | Lewis | 370/15 |

FOREIGN PATENT DOCUMENTS

| | | | |
|---|---|---|---|
| A3212031 | 6/1983 | Fed. Rep. of Germany . | |
| 0072351 | 4/1985 | Japan | 370/13 |
| 0241349 | 11/1985 | Japan | 370/94 |

OTHER PUBLICATIONS

T. H. Beeforth et al., "Proposed Organization for Packet-Switched Data-Communication Network", IEEE, vol. 119, No. 12, Dec. 1972, pp. 1677–1682.

Tanenbaum, A. S., "Routing Algorithms", *Computer Networks*, Prentice-Hall, Inc., 1981, pp. 196–214.

Aug. 1979, Bolt Beranek and Newman, Inc., Report No. 4098, "Development of a Voice Funnel System".

M. L. Larson et al., "Lockup Detection and Recovery in a Packet Switching Network", Application Ser. No. 671,468, filed Nov. 11, 1984.

W. Boghdady et al.: "A Technique for Fault-Detection and Performance Measurement in Data Communications Networks", pp. 1366–1370, IEEE, International Conference on Communications, ICC, '84, 14–17 May, 1984, Amsterdam, The Netherlands, vol. 3, IEEE.

F. E. Heart et al.: "The Interface Message Processor for the ARPA Computer Network", pp. 551–567, Proceedings of the Spring Joint Computer Conference, 5–7 May 1970, Atlantic City, N.J., vol. 36, Afips Press.

*Primary Examiner*—Douglas W. Olms
*Assistant Examiner*—Melvin Marcelo
*Attorney, Agent, or Firm*—Ross T. Watland

[57] ABSTRACT

A packet network test arrangement where a test packet is transmitted from a test source to a test destination via successive nodes of the packet network. Any node that fails to receive acknowledgement within a predetermined time of transmitting the test packet to a subsequent node responds by transmitting information to the test source concerning the failure and particularly defining the involved nodes. Accordingly, a single test can be used advantageously both to detect faults and to localize such faults between two network nodes. The test arrangement also provides for the loop-around of test packets received at the test destination thus enabling the test source to verify successful packet communications.

25 Claims, 4 Drawing Sheets

| DESTI-NATION | SOURCE | PACKET TYPE | PACKET NO. | TEST PARAMETERS | { INTERMEDIATE NODE IDs } | BIT PATTERN |

TEST PACKET FORMAT

FIG. 2

| DESTI-NATION | SOURCE | PACKET TYPE | PACKET NO. | TEST RESULT | { INTERMEDIATE NODE IDs } | BIT PATTERN |

TEST RESULT PACKET FORMAT

FIG. 3

ROUTING TABLE FOR NODE 20

| DESTINATION | FIRST CHOICE | | SECOND CHOICE | | THIRD CHOICE | |
|---|---|---|---|---|---|---|
| ⋮ | | | | | | |
| 23 | 19 | 0.60 | 24 | 0.20 | 16 | 0.20 |
| 24 | 24 | 0.90 | 19 | 0.05 | 28 | 0.05 |
| 25 | 16 | 0.70 | 28 | 0.30 | – | – |
| 26 | 24 | 0.80 | 16 | 0.10 | 11 | 0.10 |
| 27 | 24 | 0.45 | 16 | 0.45 | 28 | 0.10 |
| 28 | 28 | 0.70 | 24 | 0.20 | 19 | 0.10 |
| 29 | 29 | 0.95 | 28 | 0.05 | – | – |
| 30 | 29 | 0.50 | 16 | 0.50 | – | – |
| 31 | 28 | 0.40 | 29 | 0.40 | 24 | 0.20 |
| ⋮ | | | | | | |

FIG. 5

ARRANGEMENT FOR TESTING PACKET SWITCHING NETWORKS

TECHNICAL FIELD

This invention relates to packet switching networks and particularly to techniques for fault detection and isolation in such networks.

BACKGROUND OF THE INVENTION

Loop-around testing is frequently performed in switching networks to verify correct network operation. A test signal is generated at a test source, transmitted via the particular network path being tested to a destination, and then looped from the destination back to the test source. The source compares the returned signal with the transmitted test signal to verify the network path. Although loop-around techniques have been used most extensively in circuit switching networks implemented using either analog or digital switching elements, such techniques are also used to advantage to verify the communication of packets in, for example, the packet switching network of U.S. Pat. No. 4,486,877 issued to J. S. Turner on Dec. 4, 1984. Test packets are transmitted from a central processor associated with the Turner network to various network destinations, and then looped back to the central processor. Although loop-around tests efficiently detect the presence or absence of faults in a network, additional measures are typically required to determine the location of faults once they are detected.

Fault location information is important in packet networks not only to allow repair or replacement of defective equipment but also to allow rapid packet routing adjustments to be made within the network. Fault location measures are typically expensive and time-consuming, particularly in large regional or national packet networks, and in distributed packet networks where the switching nodes operate without a network central processor and individual nodes are in most cases unaware of the overall network topology.

In view of the foregoing, a recognized problem in the art is the need to conduct additional tests to isolate faults in a packet switching network once such faults have been detected.

SUMMARY OF THE INVENTION

The foregoing problem is solved and a technical advance is achieved in accordance with the principles of the invention in an exemplary packet network test arrangement where a test packet is transmitted from a test source to a test destination via successive nodes of the packet network, and where any node that fails to receive an acknowledgment within a predetermined time of transmitting the test packet to a subsequent node responds by transmitting information to the test source concerning the failure and particularly defining the involved nodes. Accordingly, a single test can be used advantageously both to detect faults and to localize such faults between two network nodes. The test arrangement also provides for the loop-around of test packets received at the test destination thus enabling the test source to verify successful packet communications.

The test arrangement of the invention is used to test a packet switching network comprising a plurality of packet switching nodes. Upon receiving a test packet from a test source, a first node transmits the test packet to a second node. Upon failing to receive acknowledgment from the second node within a predetermined time, the first node transmits information concerning the failure back to the test source. The transmission of failure information occurs when a test packet is not received by the second node, when the second node fails to acknowledge a received test packet, or when the first node fails to receive a returned acknowledgment.

In an exemplary test arrangement described herein, the test packet transmitted by the test source optionally defines the intermediate nodes comprising the route to be traversed in reaching the test destination. Alternatively, the intermediate node identifications are added in as the test packet is transmitted through the network. In either case, a test result packet including the failure information is transmitted back via a reverse route through the network to the test source. This permits a rapid distribution of failure information to the nodes of the network.

DRAWING DESCRIPTION

FIGS. 2 and 3 are diagrams of packet formats used for test packets and test result packets within the network of FIG. 1;

FIG. 5 is an exemplary routing table for a packet switching node in the network of FIG. 1.

DETAILED DESCRIPTION

Figure 1:
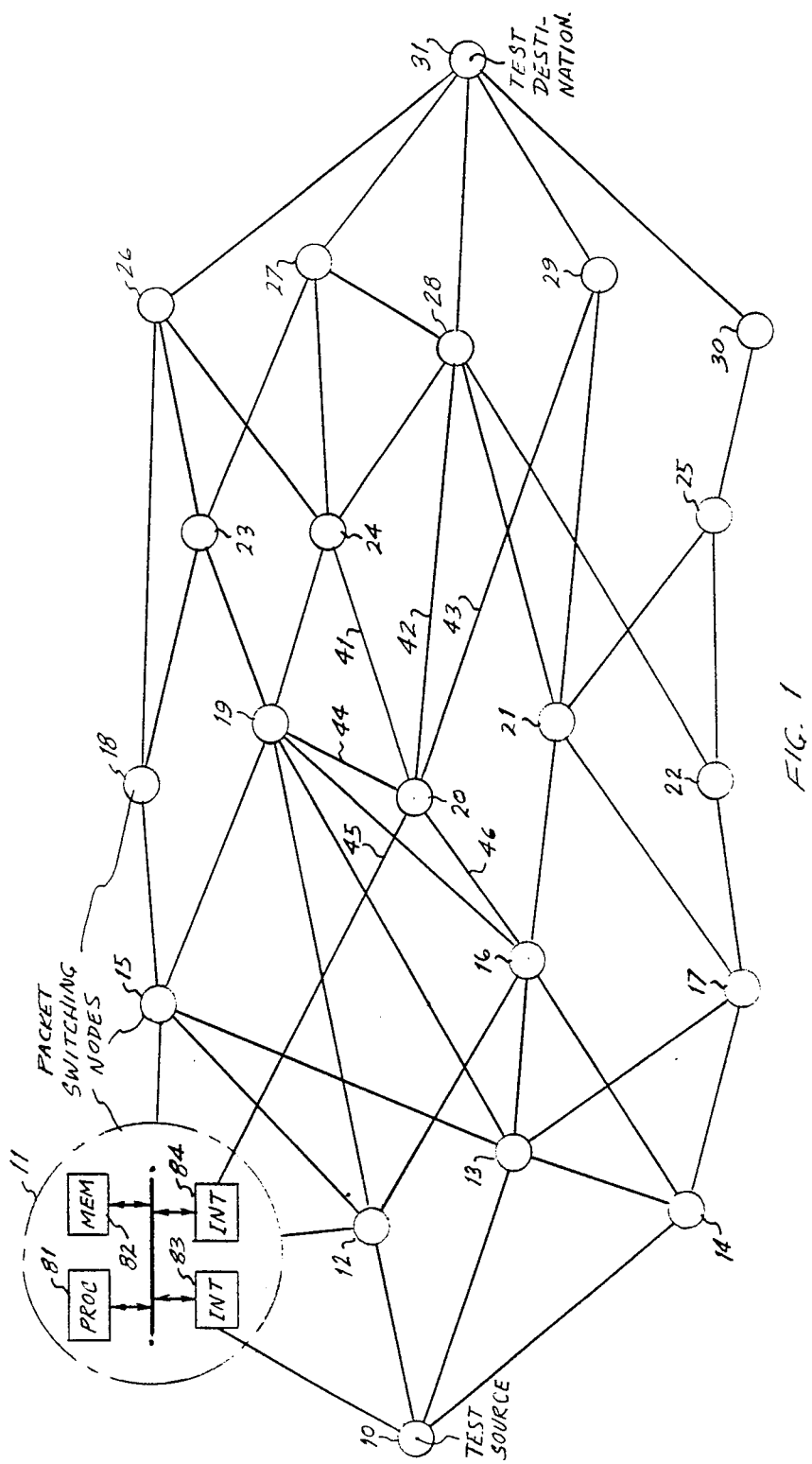
FIG. 1 is a diagram of a portion of a packet switching network implementing the test arrangement of the invention.

FIG. 1 is a diagram of a portion of an illustrative packet switching network 50 where the test arrangement of the present invention is implemented. Examples of packet switching networks are the ARPANET network of the U.S. Department of Defense and the network disclosed in U.S. Pat. No. 4,486,877 of J. S. Turner, issued Dec. 4, 1984. The invention is applicable in networks which are part of a single switching system, larger networks comprising many telephone switching offices, and specifically in an integrated services digital network (ISDN). An ISDN is defined as a network evolved from the telephony integrated digital network that provides end-to-end digital connectivity to support a wide range of services, including voice and non-voice services, to which users have access by a limited set of standard multipurpose customer interfaces. The portion of network 50 shown in FIG. 1 comprises a plurality of packet switching nodes 10 through 31 and bidirectional, interconnecting links, e.g., links 41 through 46 emanating from node 20. The nodes and links shown in FIG. 1 are all of potential use for packet communications between nodes 10 and 31. Each node includes a processor, a memory, and interface facilities to adjacent nodes for use in processing packets. For example, node 11 includes processor 81, memory 82, and interface facilities 83 and 84.

To illustrate the test method of the invention, assume that switching node 10, or a customer served thereby, wants to verify packet communication with node 31, either in response to a trouble report or as part of a scheduled network test. Node 10 formulates one or more test packets of the format shown in FIG. 2 for transmission to node 31. The test packet format includes destination and source fields, which, in the present example, define nodes 31 and 10, respectively. The format includes a packet type field, defining the packet as a test packet, and a packet number field, uniquely defining each of the test packets to be transmitted. A test parameters field defines characteristics of the test such as T, the maximum time that a node waits to receive an acknowledgement from a succeeding node, and N, the maximum number of retransmissions allowable between nodes. A number of intermediate node IDs may be optionally specified in the packet. If, for example, node 10 is aware of all links and nodes between itself and node 31, it may define that particular test packets traverse the network via specified paths. For example, node 10 may specify that test packet 1 is routed to node 31 via nodes 12, 19, 24, and 28, but that test packet 2 is routed via nodes 14, 16, 21, and 29. By methodically specifying all possible routes to node 31, node 10 can transmit test packets to perform a comprehensive test. However, node 10 may not specify any intermediate nodes in the test packet, in which case, the routing decisions are left to the routing processes performed by processors at the individual nodes. In that case, the intermediate node ID fields are filled in as the test packet traverses the network. As another alternative, node 10 may specify only partial routes to node 31, for example, specifying nodes 14, 17, and 22 but leaving the remainder of the route to be decided by individual nodes. The test packet format of FIG. 2 also includes a bit pattern field which is filled with a pseudorandom number derived from a known seed.

A link-level protocol is operative between each pair of adjacent interconnected nodes in network 50. In accordance with the link-level protocol, the packets transmitted from a given node are each enclosed in a link-level frame including a cyclic redundancy code (CRC). A receiving node regenerates the CRC and requests a retransmission of the frame if an error is detected.

Each intermediate node that receives a test packet first acknowledges receipt of the test packet. Such acknowledgment is effected by transmitting an acknowledgment packet to the previous node or including an acknowledgment in an information packet being conveyed to the previous node. Such information packets may represent voice, data or image information. After acknowledging receipt to the previous node, the intermediate node transmits the received test packet on to one or more succeeding nodes. For example, when node 20 receives a test packet from node 16, it first acknowledges receipt of the test packet to node 16, and then transmits the test packet on to a subsequent node, e.g., node 28. However, node 20 retains a copy of the test packet. Node 20 starts a timer upon transmission of the test packet to node 28 and also monitors any retransmissions that may be effected between nodes 20 and 28 as a result of detected CRC errors. If node 20 does not receive an acknowledgement from node 28 within the time T specified in the test parameters field of the test packet, or if it detects more than the maximum number, N, of retransmissions specified in the test parameters field, node 20 uses its copy of the test packet to formulate a test result packet. The format of the test result packet is shown in FIG. 3. Again, the format includes destination and source fields. In the present example, the destination field specifies node 10 as the destination and node 20 as the source of the test result packet. The packet type field defines the packet as a test result packet, and the packet number field coincides with the packet number of the test packet. The test result field defines the result of a test packet transmission. For example, the test result field may specify that a test packet destined for node 31 was transmitted from node 20 to node 28 but that no acknowledgment was received from node 28 within the specified time T, or that greater than N retransmissions occurred between nodes 20 and 28. The test result packet format also includes fields specifying intermediate node IDs. Such intermediate node IDs are obtained from the copy of the test packet in order that the test result packet can be routed over the reverse route back to node 10. The test result packet also includes the bit pattern field copied from the test packet.

If the test packet is successfully received at the destination node 31, the test packet is effectively looped back to node 10 by generating a test result packet defining a successful result.

As mentioned above, node 10 may not be aware of the nodes and links to node 31 and may leave the intermediate node ID fields of transmitted test packets open. By generating a number of test packets, e.g., 100, the most probable routes to node 31 are tested. If there are no faults in the network, node 10 receives 100 test result packets from node 31 defining successful traversal of the network. However, an encountered network fault results in the transmission of a test result packet from the last node successfully receiving the packet back to the test source. Node 10 checks the bit pattern fields of received test result packets by regenerating the pseudorandom numbers using the known seeds.

In accordance with one known routing method, referred to as static or directory routing, each node stores a routing table with one row for each possible destination node. A row gives the best, second best, third best, etc. outgoing link for that destination, together with a relative weight. Before transmitting a received packet, a node generates a random number and then chooses among the alternatives, using the weights as probabilities. A portion of an exemplary routing table for node 20 is given in FIG. 5. A preferred test method involves transmitting test packets from a given node to the M most probable next nodes. M is an additional parameter specified in the test parameters field of test packets. Assume, for example, that M=2. Node 10 initially inspects its routing table and determines that the two preferred routes to node 31 have nodes 12 and 13 as the next nodes. Accordingly, node 10 transmits test packets to both nodes 12 and 13. Nodes 12 and 13 repeat the process by determining their two preferred routes to node 31. Node 20, for example, upon receiving a test packet, determines that the two preferred routes to node 31 have nodes 28 and 29 as their next nodes (FIG. 5). Accordingly, node 20 transmits test packets to both nodes 28 and 29. This procedure allows the most probable routes between any two nodes to be tested contemporaneously.

Figure 4:
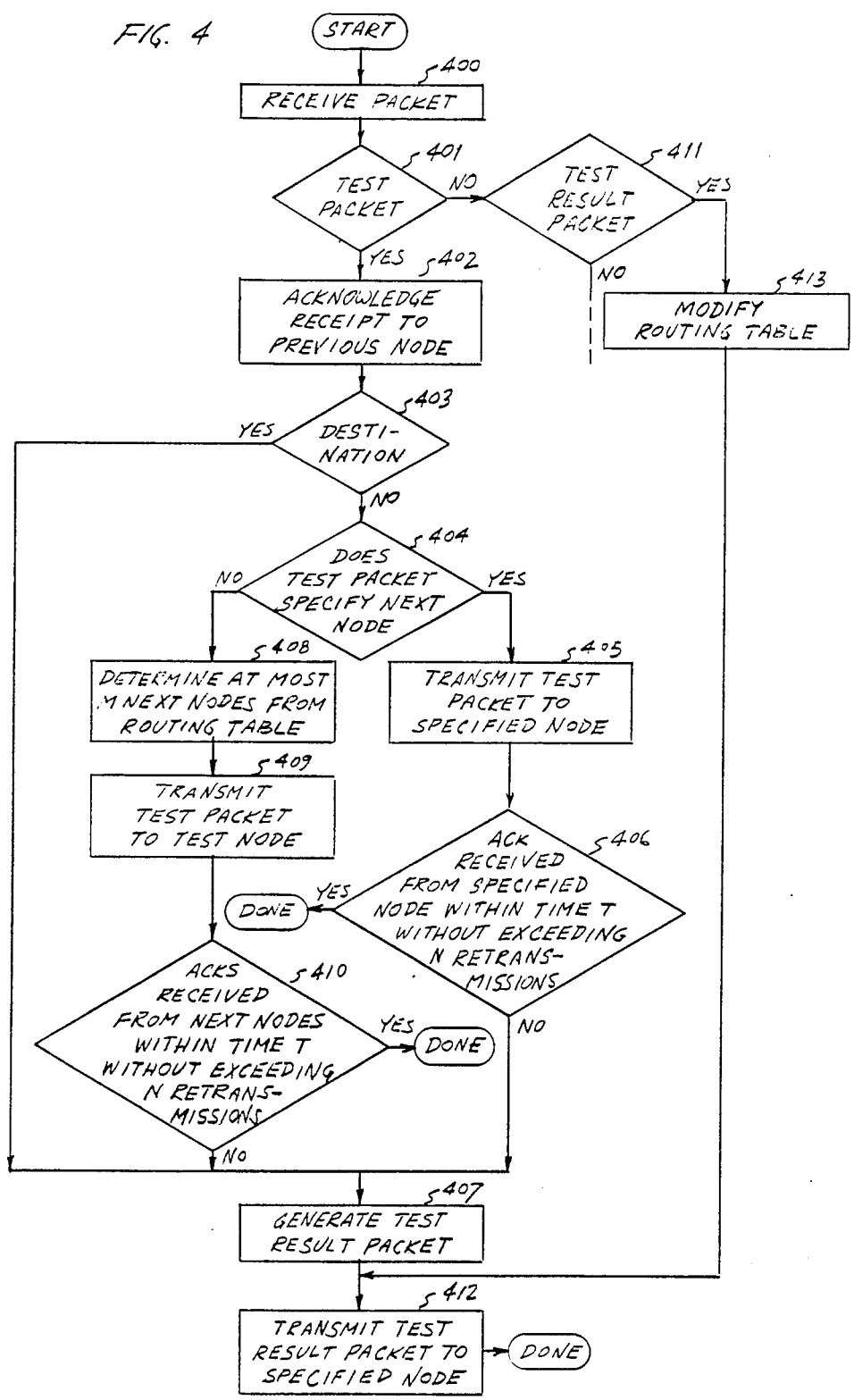
FIG. 4 is a flow chart for a packet processing program used by packet switching nodes in the network of FIG. 1.

FIG. 4 is a flow chart for a packet processing program used in each of the packet switching nodes of network 50. Execution begins with block 400 where a packet is received by a given node. In block 401, the packet type field of the received packet is inspected to determine if the packet is a test packet. If the packet is a test packet, execution proceeds from block 401 to block 402, where receipt of the packet is acknowledged, and then to block 403 where it is determined whether the given receiving node is the defined test packet destination. If the node is the test packet destination, execution proceeds from block 403 to block 412. In block 412, a test result packet defining the successful traversal of network 50 is looped back to the test source via the specified intermediate node IDs, which were either initially defined by node 10 prior to transmission of the test packet, or were filled in as the test packet was routed from node to node. If it is determined during block 403 that the given receiving node is not the packet destination, execution proceeds to block 404 and the intermediate node ID fields are inspected to determine whether they define the next node to which the test packet is to be transmitted. If the next node is specified, execution proceeds from block 404 to block 405 and the test packet is transmitted to the specified node. Execution continues with block 406 during which it is determined if an acknowledgment of the test packet is received within the time T without exceeding N retransmissions of the test packet, where T and N are defined in the test parameters field of the test packet. If an acknowledgment is received within time T without exceeding N retransmissions, processing of the packet has been completed by the given node and the stored copy of the test packet may be deleted from the node memory. However, if no acknowledgment is received within T seconds or if more than N retransmissions occur, execution proceeds from block 406 to block 407 where a test result packet defining the particular failure is generated. Then in block 412, the test result packet is transmitted back toward the test source.

If it is determined during block 404 that the test packet does not specify the next node, execution branches from block 404 to block 408. In block 408, the routing table for the given node is inspected and at most M next nodes are determined from the table for the preferred routes to the destination, where M is an additional parameter specified in the test parameters field of the test packet. Execution proceeds to block 409 and test packets are transmitted to each of the next nodes determined in block 408. Execution continues with block 410 during which it is determined if all transmitted test packets are acknowledged within time T without exceeding N retransmissions. If all transmitted test packets are acknowledged within time T without exceeding N retransmissions, processing of the packet has been completed by the given node and the stored copy of the packet is deleted from the node memory. However, if no acknowledgment is received within T seconds for one or more of the transmitted packets, or if transmission of one or more of the packets results in more than N retransmissions of a packet, execution proceeds from block 410 to block 407 where a test result packet is generated. The test result packet defines each of the detected failures. In block 412, the test result packet is transmitted back toward the source.

If it is determined during block 401 that the received packet is not a test packet, execution proceeds to block 411 where the packet type field is inspected to determine whether the packet is a test result packet. If the packet is a test result packet, execution proceeds from block 411 to block 413 where the routing table for the given node is modified based on the failure information in the test result packet. For example, if node 20 receives a test result packet indicating a failed packet communication between nodes 29 and 31, node 20 modifies the routing table of FIG. 5 such that the second choice next node for destination 31 is node 24 rather than node 29. The probabilities are changed to 0.67 for node 28 and 0.33 for node 24 so that the same relative probability is maintained between nodes 28 and 24. Execution proceeds to block 412 and the test result packet is transmitted on to the next specified node.

As mentioned above, the test result packet is returned to the source via a route which is the reverse of the route followed by the test packet. For example, a test packet destined for node 31 may be transmitted from node 10 to nodes 12, 16, 21 and 29 before a failure occurs between nodes 29 and 31. Node 29 formulates a test result packet with destination and source fields defining nodes 10 and 29, respectively, with a test result field defining the failure between nodes 29 and 31 concerning the test packet destined for node 31, and with intermediate node ID fields defining nodes 21, 16 and 12 as the reverse route back to node 10. Each of the intermediate nodes 21, 16 and 12, periodically informs adjacent nodes of failures such that adjacent nodes may also appropriately modify their routing tables.

As an alternative to the transmission of test packets between specified nodes, each node may periodically broadcast test packets in the format of FIG. 2 to each of its adjacent nodes. The test parameters field of such test packets specifies the timeout period, T, and the maximum number, N, of retransmissions. In addition, the test parameters field also specifies a number, H, defining the maximum number of hops a given test packet will make. For example, node 20 may transmit test packets defining $H=3$ via links 46, 43, 42, 41, 44 and 45 to each of its adjacent nodes 16, 29, 28, 24, 19 and 11, respectively. Node 16, for example, decrements H such that $H=2$ and transmits test packets to each of its adjacent nodes 12, 13, 14, 21 and 19 other than node 20, from which the test packet was received by node 16. Any unsuccessful packet communication, as indicated by a failure to receive acknowledgment of a test packet within the time T or without more than N retransmissions, is reported back by transmitting a test result packet along the reverse route back to the source node 20. The use of the parameter H allows the testing to be localized within a specified number of hops from a given source node.

It is important to note that each of the above-described tests may be effected without interrupting the normal communication of information packets by packet switching network 50.

What is claimed is:

1. In a test arrangement for testing communication from a test source to a test destination via a packet switching network comprising a plurality of packet switching nodes and a plurality of bidirectional links each interconnecting a distinct pair of said nodes, a test method comprising in response to a receipt of a test packet from said test source, one of said nodes transmitting said test packet to another of said nodes via the one of said links interconnecting said one node and said another node and in response to a failure to receive acknowledgment via said one link from said another node within a predetermined time interval of said one node transmitting said test packet, said one node transmitting information to said test source defining said failure as concerning packet transmission between said one node and said another node via said one link.

2. A method in accordance with claim 1 wherein said information comprises a test result packet defining a reverse route from said one node to said test source comprising ones of said plurality of nodes traversed by said test packet.

3. A method in accordance with claim 2 wherein said test packet from said test source specifies said predetermined time interval.

4. A method in accordance with claim 1 wherein said test packet from said test source specifies said predetermined time interval.

5. A method in accordance with claim 1 further comprising said one node retransmitting said test packet to said another node more than a fixed number of times and upon retransmitting said test packet to said another node more than a fixed number of times, said one node transmitting information to said test source concerning said retransmissions of said test packet.

6. A method in accordance with claim 5 wherein said test packet from said test source specifies said fixed number.

7. A method for testing a packet switching network comprising a plurality of packet switching nodes and a plurality of bidirectional links each interconnecting a distinct pair of said nodes, said method comprising transmitting a test packet from a test source to a test destination via said network, upon receiving said test packet from said test source, a first one of said nodes transmitting said test packet to a second one of said nodes via the one of said links interconnecting said first node and said second node, upon receiving said test packet from said first node, said second node acknowledging receipt of said test packet to said first node via said one link, and upon a failure to receive acknowledgment via said one link from said second node within a predetermined time interval of said first node transmitting said test packet, said first node transmitting information to said test source defining said failure as concerning packet transmission between said first node and said second node via said one link.

8. A method in accordance with claim 7 further comprising upon receiving said test packet, said test destination looping said test packet back to said test source.

9. A method in accordance with claim 8 wherein said information comprises a test result packet defining a reverse route from said first node to said test source comprising ones of said plurality of nodes traversed by said test packet.

10. A method in accordance with claim 9 wherein said test packet transmitted from said test source specifies said predetermined time interval.

11. A method in accordance with claim 7 wherein said test packet transmitted from said test source defines a route from said test source to said test destination comprising ones of said plurality of nodes.

12. A method in accordance with claim 7 further comprising as said test packet is transmitted from said test source via ones of said plurality of nodes, adding information into said test packet defining said ones of said nodes.

13. A method in accordance with claim 7 wherein said information comprises a test result packet defining a reverse route from said first node to said test source comprising ones of said plurality of nodes traversed by said test packet.

14. A method in accordance with claim 7 wherein said test packet transmitted from said test source specifies said predetermined time interval.

15. A method in accordance with claim 7 further comprising said first node retransmitting said test packet to said second node more than a fixed number of times and upon retransmitting said test packet to said second node more than said fixed number of times, said first node transmitting information to said test source concerning said retransmissions of said test packet.

16. A method in accordance with claim 15 wherein said test packet transmitted from said test source specifies said fixed number.

17. A method in accordance with claim 7 wherein said test source and said test destination are packet switching nodes of said network.

18. In a test arrangement for testing communication from a test source to a test destination via a packet switching network comprising a plurality of packet switching nodes and a plurality of bidirectional links each interconnecting a distinct pair of said nodes, a test method comprising in response to a receipt of a test packet from said test source, one of said nodes transmitting said test packet to other ones of said nodes via the ones of said links interconnecting said one node and said other ones of said nodes and in response to a failure to receive acknowledgment from each of said other ones of said nodes via the one of said links interconnecting said one node and said each other node within a predetermined time interval of said one node transmitting said test packet, said one node transmitting information to said test source defining said failure as concerning packet transmission between said one node and said each other node.

19. A method in accordance with claim 18 wherein the number of said other nodes is at most M, where M is a positive integer greater than one.

20. A method in accordance with claim 19 wherein said test packet from said test source specifies said integer M.

21. A method for testing a packet switching network comprising a plurality of packet switching nodes and a plurality of bidirectional links each interconnecting a distinct pair of said nodes, said method comprising broadcasting a test packet from a first one of said nodes to other ones of said nodes, any of said nodes receiving said test packet, broadcasting said test packet to other ones of said nodes, any of said nodes receiving said test packet, acknowledging receipt of said test packet to the one of said nodes from which said test packet is received, any of said nodes other than said first node, upon a failure to receive acknowledgment via ones of said links from ones of said nodes to which said any node other than said first node has broadcast said test packet, transmitting information to said first node defining said failure as concerning packet transmission via said ones of said links between said any node other than said first node and said ones of said nodes to which said any node other than said first node has broadcast said test packet.

22. In a test arrangement for testing communication from a test source to a test destination via a packet switching network comprising a plurality of packet switching nodes and a plurality of bidirectional links each interconnecting a distinct pair of said nodes, each of said nodes comprising means responsive to a receipt of a test packet from said test source for transmitting said test packet to said test destination via one of said links and means responsive to a failure to receive via said one link acknowledgment of receipt of said transmitted test packet for transmitting information to said test source defining said failure as concerning packet transmission from said each node via said one link.

23. A packet switching node in accordance with claim 22 wherein said means for transmitting said information comprises timer means for defining elapsed time from the transmission of said test packet by said means for transmitting said test packet, means for detecting acknowledgment of receipt of said transmitted test packet and means responsive to said timer means and said detecting means for transmitting said information to said test source when said timer means defines an elapsed time exceeding a predetermined time without a detection of acknowledgment of receipt of said transmitted test packet by said detecting means.

24. A packet switching node in accordance with claim 23 further comprising means responsive to a receipt of a test packet defining said node as said test destination, for looping said test packet defining said node as said test destination back to said test source.

25. In a test arrangement for testing communication of a test packet from a test source to a test destination, a packet switching network interconnecting said source and destination and comprising a plurality of packet switching nodes and a plurality of bidirectional links each interconnecting a distinct pair of said nodes each of said nodes comprising means for acknowledging receipt of said test packet to one of said nodes from which said test packet is received, means for transmitting said test packet received from said one node to another one of said nodes via one of said links and means responsive to a failure to receive via said one link acknowledgment of receipt of said test packet from said another node for transmitting information via said network to said test source defining said failure between said each node and said another node via said one link.

* * * * *